United States Patent
Zhang et al.

(10) Patent No.: US 10,613,909 B2
(45) Date of Patent: Apr. 7, 2020

(54) METHOD AND APPARATUS FOR GENERATING AN OPTIMIZED STREAMING GRAPH USING AN ADJACENCY OPERATOR COMBINATION ON AT LEAST ONE STREAMING SUBGRAPH

(71) Applicant: Huawei Technologies Co., Ltd., Shenzhen (CN)

(72) Inventors: Songshan Zhang, Shenzhen (CN); Mingzhen Xia, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/640,685

(22) Filed: Jul. 3, 2017

(65) Prior Publication Data

US 2017/0300367 A1    Oct. 19, 2017

Related U.S. Application Data

(63) Continuation of application No. PCT/CN2015/098695, filed on Dec. 24, 2015.

(30) Foreign Application Priority Data

Jan. 4, 2015    (CN) .......................... 2015 1 0003823

(51) Int. Cl.
*G06F 9/50* (2006.01)
*G06F 16/901* (2019.01)
(Continued)

(52) U.S. Cl.
CPC .......... *G06F 9/5083* (2013.01); *G06F 9/3005* (2013.01); *G06F 16/24568* (2019.01); *G06F 16/9024* (2019.01)

(58) Field of Classification Search
None
See application file for complete search history.

(56) References Cited

U.S. PATENT DOCUMENTS 8,037,284 B2 * 10/2011 Schenfeld ............. G06F 9/5061
709/231
8,176,196 B2 *  5/2012 Katsunuma ....... G06F 16/24568
709/231

(Continued)

FOREIGN PATENT DOCUMENTS

CN          101630275 A      1/2010
CN          104050543 A      9/2014
(Continued)

OTHER PUBLICATIONS

Eldawy et al. "Clustering Streaming Graphs", 2012 IEEE, pp. 466-475.*

(Continued)

*Primary Examiner* — Van H Nguyen
(74) *Attorney, Agent, or Firm* — Slater Matsil, LLP

(57) ABSTRACT

A streaming graph optimization method and apparatus are disclosed, relating to the stream processing field. A stream application streaming graph provided by a user is received and the streaming graph is parsed and a streaming graph described by an operator node and a data stream side is constructed. Additionally the streaming graph is disassembled according to a maximum atom division principle, so as to obtain at least one streaming subgraph and adjacency operator combination is performed on the at least one streaming subgraph according to a combination algorithm, so as to obtain an optimized streaming graph.

17 Claims, 8 Drawing Sheets

(51) Int. Cl.
*G06F 16/2455* (2019.01)
*G06F 9/30* (2018.01)

(56) References Cited

U.S. PATENT DOCUMENTS

| | | | | |
|---|---|---|---|---|
| 8,407,360 | B2* | 3/2013 | Andrade | G06F 9/5066 709/231 |
| 8,490,072 | B2* | 7/2013 | Andrade | G06F 8/433 717/132 |
| 8,782,650 | B2* | 7/2014 | Takahashi | H04L 67/1029 718/102 |
| 8,843,524 | B2* | 9/2014 | Branson | G06F 16/9024 707/791 |
| 8,849,888 | B2* | 9/2014 | Fawcett | H04L 67/1002 709/201 |
| 8,856,060 | B2* | 10/2014 | Ranganathan | G06N 5/025 706/48 |
| 8,887,056 | B2* | 11/2014 | Breternitz | G06F 9/505 715/735 |
| 9,600,550 | B2* | 3/2017 | Stevens | H04L 43/06 |
| 2008/0133209 | A1 | 6/2008 | Bar-Or et al. | |
| 2010/0325621 | A1 | 12/2010 | Andrade et al. | |
| 2011/0131554 | A1 | 6/2011 | Doi et al. | |
| 2013/0290969 | A1 | 10/2013 | Branson et al. | |
| 2014/0089351 | A1* | 3/2014 | Branson | G06F 16/9024 707/798 |
| 2014/0136723 | A1 | 5/2014 | Branson et al. | |
| 2014/0297665 | A1* | 10/2014 | Stevens | H04L 43/06 707/754 |
| 2015/0378797 | A1 | 12/2015 | Zhang et al. | |
| 2016/0110228 | A1 | 4/2016 | Zhang | |

FOREIGN PATENT DOCUMENTS

| | | |
|---|---|---|
| CN | 104052811 A | 9/2014 |
| CN | 104239141 A | 12/2014 |
| CN | 104504143 A | 4/2015 |

OTHER PUBLICATIONS

Sodhi et al. "A Cloud Architecture Using Smart Nodes", 2011 IEEE, pp. 116-123.*
Matthias J. Sax et al., "Aeolus: An Optimizer for Distributed Intra-Node-Parallel Streaming Systems", ICDE Conference 2013, pp. 1280-1283.
Dayarathna, M. et al., "Automatic Optimization of Stream Programs via Source Program Operator Graph Transformations," Distrib Parallel Databases, 31:543-599, DOI 10.1007/s10619-013-7130-x, XP035360073, vol. 31, No. 4, Aug. 10, 2013, 57 pages.
Gedik, B. et al., "A Model-based Framework for Building Extensible, High Performance Stream Processing Middleware and Programming Language for IBM InfoSphere Streams," Software Practice and Experience, 42:1363-1391, vol. 42, No. 11, XP055418940, Nov. 13, 2011, 29 pages.
Hirzel, M. et al., "A Catalog of Stream Processing Optimizations," ACM Computing Surveys, ACM New York, NY, vol. 46, No. 4, XP058043920, Mar. 1, 2014, 34 pages.
Liew, C.S. et al., "Towards Optimising Distibuted Data Streaming Graphs using Parallel Streams," High Perfomance Distrubuted Computing, ACM, XP058149140, Jun. 2010, 12 pages.
Suzumura, T. et al., "Towards Large-Scale Graph Stream Processing Platform," World Wide Web Companion, International World Wide Web Conferences Steering Committee, Republic and Canton of Geneva Switzerland, XP058047644, Apr. 7, 2014, 6 pages.

* cited by examiner

METHOD AND APPARATUS FOR GENERATING AN OPTIMIZED STREAMING GRAPH USING AN ADJACENCY OPERATOR COMBINATION ON AT LEAST ONE STREAMING SUBGRAPH

CROSS-REFERENCE TO RELATED APPLICATIONS

This application is a continuation of International Application No. PCT/CN2015/098695, filed on Dec. 24, 2015, which claims priority to Chinese Patent Application No. 201510003823.4, filed on Jan. 4, 2015. The disclosures of the aforementioned applications are hereby incorporated by reference in their entireties.

TECHNICAL FIELD

Embodiments of the present invention relate to the stream processing field, and more specifically, to a streaming graph optimization method and apparatus.

BACKGROUND

Stream computing, that is, real-time stream processing, refers to processing to-be-processed data in a form of a data stream. A data stream is an aggregate of a series of data records that are limitless in terms of time distribution and quantity. A data tuple is a smallest composition unit of the data stream. A most important characteristic of the stream computing is that a real-time response to a computing result can be implemented. Value of data decreases with elapse of time; therefore, data needs to be processed as soon as possible after the data appears. It is preferred that data is processed immediately when the data appears. A meaning of the stream computing is processing data each time a piece of data appears, rather than processing data in batches after the data is cached.

FIG. 1 may be used to represent a stream computing model graph, which is referred to as streaming graph for short. As shown in FIG. 1, operators op1 to op7 in the figure represent operators, and sides s1 to s7 in the figure represent data streams. An operator is a data processing unit that carries service logic, and is a smallest unit that is executed for distributed scheduling of a stream computing platform. A data stream is data exchanged between operators.

A user compiles a streaming graph, and submits the compiled streaming graph to the stream computing platform. The stream computing platform parses the streaming graph, and schedules the streaming graph to different physical machines for distributed execution, so as to implement different service scenarios. Currently, a mainstream stream computing platform in the industry is international business machine (IBM)™ InfoSphere Streams™. In an integrated development environment of InfoSphere Streams™, by means of drag and drop editing, the user connects operators and data stream sides by using lines to form a streaming graph, and then submits the streaming graph for deployment. Quality of streaming graph compilation directly affects execution performance of a deployed application. Users who develop applications based on the stream computing platform are mostly marketers, or engineers who lack stream application development experience. Consequently, a developed streaming graph has imbalanced computing logic and redundant flow transmission, system resources cannot be fully used, and stream application execution performance is poor.

SUMMARY

Embodiments of the present invention provide a streaming graph optimization method and apparatus. By optimizing and redeploying a streaming graph, stream processing platform resource utilization and stream application execution performance are improved.

A first aspect of embodiments of the present invention provides a streaming graph optimization method applied to a stream computing system, where the stream computing system includes multiple worker nodes and a master node, the method is executed by the master node. The method includes receiving a user streaming graph; parsing the user streaming graph, and constructing a streaming graph described by an operator node and a data stream side. The method also includes disassembling the streaming graph according to a maximum atom division principle of streaming graph types to obtain at least one streaming subgraph, where any streaming subgraph of the at least one streaming subgraph includes as many operators as possible, and belongs to only one of the streaming graph types. Additionally, the method includes performing adjacency operator combination on the at least one streaming subgraph according to processing logic complexity of each streaming subgraph of the at least one streaming subgraph to obtain an optimized streaming graph, so that the processing logic complexity of each streaming subgraph is balanced after the adjacency operator combination.

With reference to the streaming graph optimization method described in the first aspect, in a first possible implementation manner of the first aspect, the streaming graph types include a pulse streaming graph, a split streaming graph, and an iterative streaming graph; the pulse streaming graph includes sequential flowing-through of a data stream in an arrangement order of streaming graph operators, the pulse streaming graph includes a pulse operator, the pulse operator includes window cache, and data output has a batch processing characteristic; the split streaming graph includes splitting of a data stream at an inlet operator, and aggregation at an outlet operator, the split streaming graph includes a split operator, and the split operator is an inlet operator or an outlet operator of the split streaming graph; and the iterative streaming graph includes returning of an output data stream at a successor operator to a predecessor operator as an input stream for iterative processing, the iterative streaming graph includes an iterative operator, and the iterative operator is an inlet operator or an outlet operator of the iterative streaming graph.

With reference to the first aspect or the first possible implementation manner of the first aspect, in a second possible implementation manner of the first aspect, the disassembling the streaming graph according to a maximum atom division principle of streaming graph types to obtain at least one streaming subgraph includes: traversing the operators in the streaming graph to find operators of multiple types, where the operators of multiple types include the iterative operator, the split operator, and the pulse operator; selecting, in descending order of priorities, from the operators of multiple types, an operator that is used as a boundary operator, where the descending order of priorities is successively an iterative operator, a split operator, and a pulse operator; and dividing, by using the maximum atom division principle of streaming graph types and according to the selected boundary operator, the operators in the streaming graph to obtain at least one streaming subgraph, where the maximum atom division principle includes: a streaming subgraph obtained through splitting includes as many operators as possible, and any streaming subgraph belongs to only one of an iterative streaming graph, a split streaming graph, or a pulse streaming graph.

With reference to the first aspect or the first possible implementation manner of the first aspect or the second possible implementation manner of the first aspect, in a third possible implementation manner of the first aspect, the performing adjacency operator combination on the at least one streaming subgraph according to processing logic complexity of each streaming subgraph of the at least one streaming subgraph to obtain an optimized streaming graph, so that the processing logic complexity of each streaming subgraph is balanced after the adjacency operator combination specifically includes: determining a combination range according to a cluster system resource and operator logic complexity; and performing, in the determined combination range, adjacency operator combination on the at least one streaming subgraph according to a combination algorithm to obtain the optimized streaming graph, so that the processing logic complexity of each streaming subgraph is balanced after the adjacency operator combination.

With reference to the third possible implementation manner of the first aspect, in a fourth possible implementation manner of the first aspect, the performing, in the determined combination range, adjacency operator combination on the at least one streaming subgraph according to a combination algorithm to obtain the optimized streaming graph specifically includes: if a to-be-combined adjacency operator is a system operator, performing adjacency operator combination on the at least one streaming subgraph according to a combination priority list to obtain the optimized streaming graph; or if a to-be-combined adjacency operator is a user-defined operator, calculating operator relative complexity before combination and operator relative complexity after combination that are of the user-defined operator, and performing adjacency operator combination on the at least one streaming subgraph to obtain the optimized streaming graph, so that the operator relative complexity after combination is less than or equal to N times the operator relative complexity before combination, where N is greater than or equal to 1.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the method further includes: deploying the optimized streaming graph to a worker node for execution.

A second aspect of embodiments of the present invention provides a streaming graph optimization apparatus applied to a stream computing system, where the stream computing system includes multiple worker nodes and a master node. The master node includes a receiving module, configured to receive a streaming graph and a parsing module, configured to parse the streaming graph, and construct a streaming graph operator and a data stream side description structure. The master node also includes a disassembling module, configured to disassemble the streaming graph according to a maximum atom division principle of streaming graph types to obtain at least one streaming subgraph and a combination module, configured to perform adjacency operator combination on the at least one streaming subgraph according to processing logic complexity of each streaming subgraph of the at least streaming subgraph to obtain an optimized streaming graph, so that the processing logic complexity of each streaming subgraph is balanced after the adjacency operator combination.

With reference to the second aspect, in a first implementation manner of the second aspect, the streaming graph types include a pulse streaming graph, a split streaming graph, and an iterative streaming graph; the pulse streaming graph includes sequential flowing-through of a data stream in an arrangement order of streaming graph operators, the pulse streaming graph includes a pulse operator, the pulse operator includes window cache, and data output has a batch processing characteristic; the split streaming graph includes splitting of a data stream at an inlet operator, and aggregation at an outlet operator, the split streaming graph includes a split operator, and the split operator is an inlet operator or an outlet operator of the split streaming graph; and the iterative streaming graph includes returning of an output data stream at a successor operator to a predecessor operator as an input stream for iterative processing, the iterative streaming graph includes an iterative operator, and the iterative operator is an inlet operator or an outlet operator of the iterative streaming graph.

With reference to the second aspect or the first implementation manner of the second aspect, in a second implementation manner of the second aspect, the disassembling module includes a query unit, a selection unit, and a disassembling unit; where the query unit is configured to traverse the operators in the streaming graph to find operators of multiple types, where the operators of multiple types include the iterative operator, the split operator, and the pulse operator; the selection unit is configured to select, in descending order of priorities, from the operators of multiple types, an operator that is used as a boundary operator, where the descending order of priorities is successively an iterative operator, a split operator, and a pulse operator; and the disassembling unit is configured to divide, by using the maximum atom division principle of streaming graph types and according to the selected boundary operator, the operators in the streaming graph to obtain at least one streaming subgraph, where the maximum atom division principle includes: a streaming subgraph obtained through splitting includes as many operators as possible, and any streaming subgraph belongs to only one of an iterative streaming graph, a split streaming graph, or a pulse streaming graph.

With reference to the second aspect or the first possible implementation manner of the second aspect or the second possible implementation manner of the second aspect, in a third possible implementation manner of the second aspect, the combination module is specifically configured to determine a combination range according to a cluster system resource and operator logic complexity, and perform, in the determined combination range, adjacency operator combination on the at least one streaming subgraph according to a combination algorithm to obtain the optimized streaming graph, so that the processing logic complexity of each streaming subgraph is balanced after the adjacency operator combination.

With reference to the third possible implementation manner of the second aspect, in a fourth possible implementation manner of the second aspect, for the performing, in the determined combination range, adjacency operator combination on the at least one streaming subgraph according to a combination algorithm to obtain the optimized streaming graph, so that the processing logic complexity of each streaming subgraph is balanced after the adjacency operator combination, the combination module is specifically configured to: if a to-be-combined adjacency operator is a system operator, perform adjacency operator combination on the at least one streaming subgraph according to a combination priority list to obtain the optimized streaming graph; or if a to-be-combined adjacency operator is a user-defined operator, calculate operator relative complexity before combination and operator relative complexity after combination that are of the user-defined operator, and perform adjacency operator combination on the at least one streaming subgraph to obtain the optimized streaming graph, so that the operator relative complexity after combination is less than or equal to N times the operator relative complexity before combination, where N is greater than or equal to 1.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the apparatus further includes a deployment module, and the deployment module is configured to deploy the optimized streaming graph to a worker node for execution.

According to the streaming graph optimization method and apparatus provided in the embodiments of the present invention, a stream application streaming graph provided by a user is received, the streaming graph is parsed, a streaming graph operator and a data stream description structure are constructed, and the streaming graph is disassembled according to a maximum atom division principle of streaming graph types, so as to obtain at least one streaming subgraph. Adjacency operator combination is performed on the at least one streaming subgraph according to processing logic complexity of each streaming subgraph of the at least one streaming subgraph, so as to obtain an optimized streaming graph, so that processing logic complexity of each streaming subgraph is balanced after the adjacency operator combination. By disassembling and combining the streaming graph provided by the user, balanced streaming graph computing logic is implemented, redundant flow transmission is reduced, and stream system resource utilization and stream application execution performance are improved.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The embodiments of the invention are described below with reference to the accompanying drawings.

Figure 1:
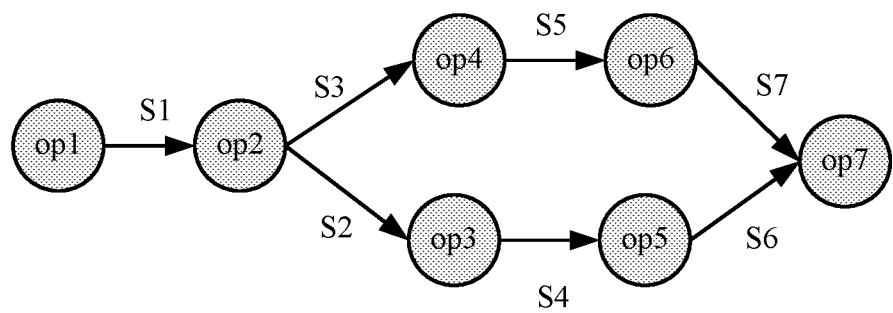
FIG. 1 is a schematic diagram of a stream computing model.
Figure 2A:
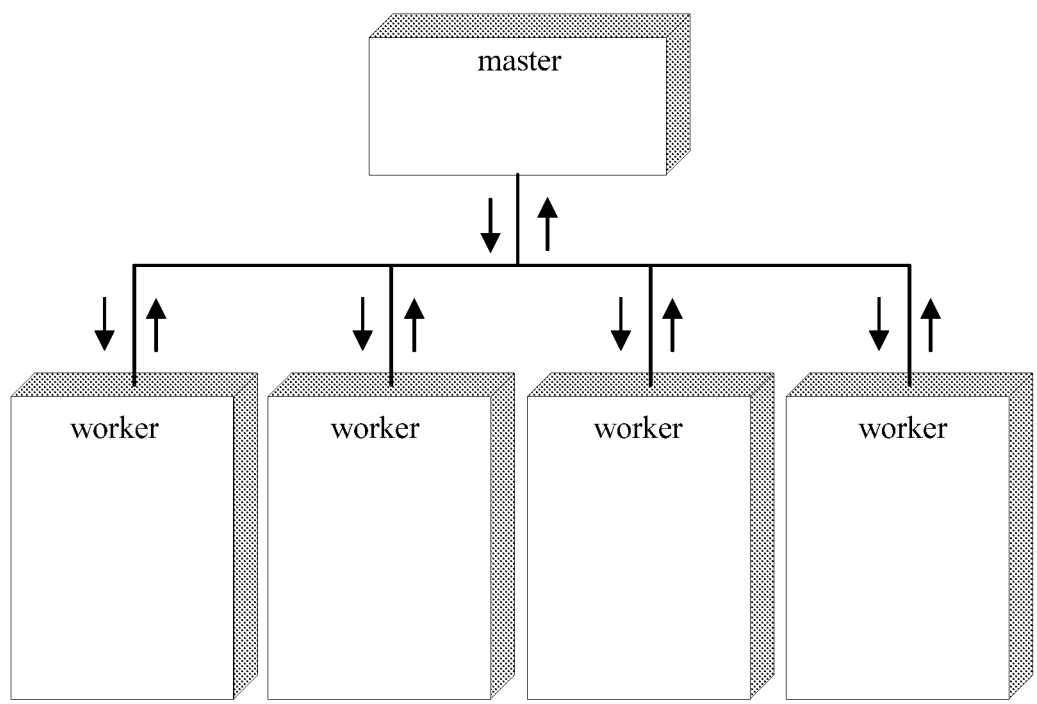
FIG. 2A is a schematic diagram of an architecture of a stream computing system according to the present embodiments.

The technical solutions provided in the embodiments of the present invention may be typically applied to a stream computing system. FIG. 2A describes a basic structure of a stream computing system, including one master node (Master) and multiple worker nodes (worker). The master node is mainly responsible for scheduling and managing all the worker nodes, and the worker nodes are logical entities that carry an actual data processing operation.

Figure 4:
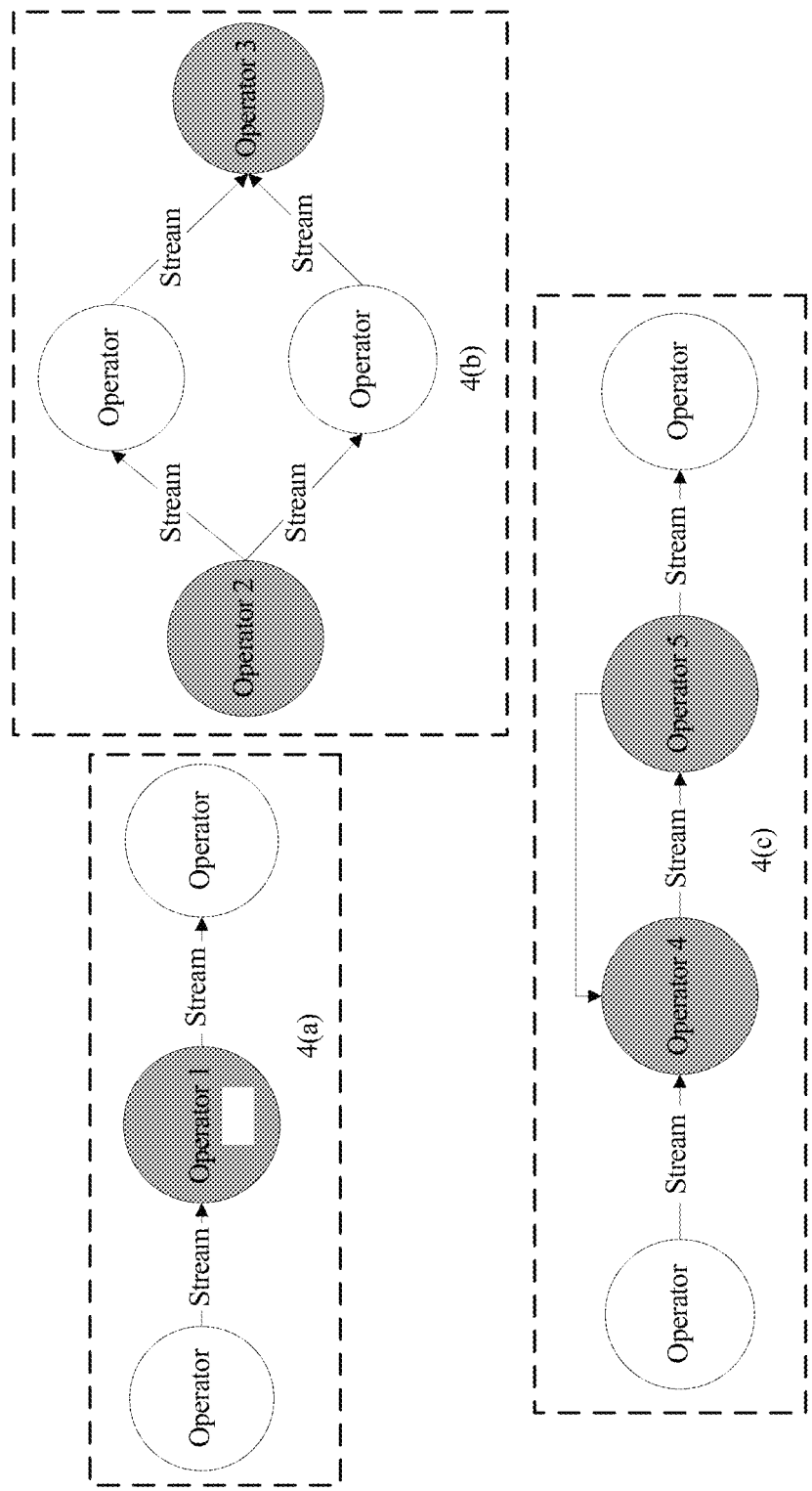
FIG. 4 is a schematic diagram of a streaming graph type according to an embodiment of the present invention.
Figure 5:
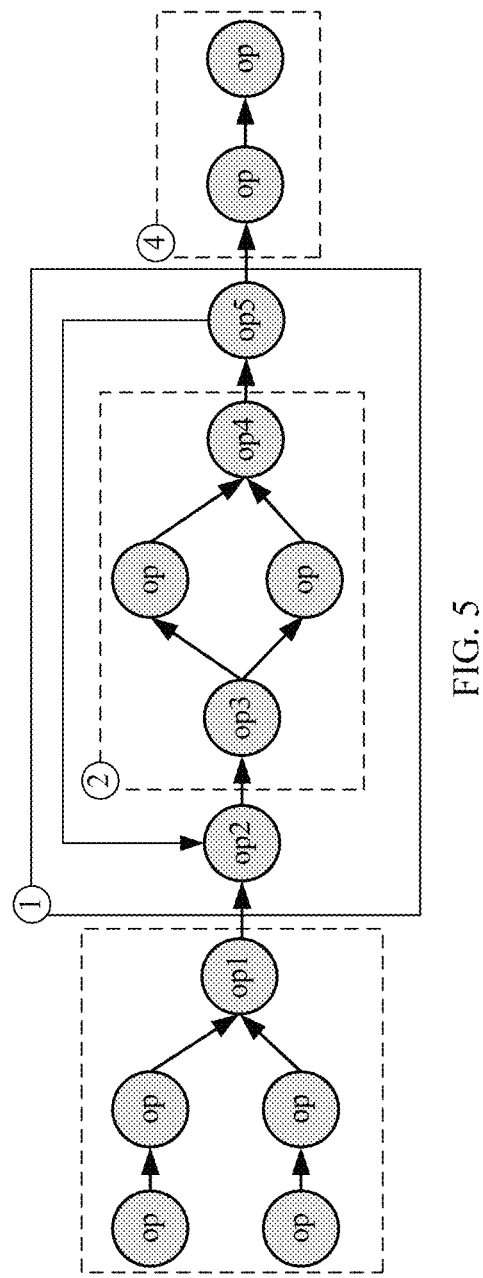
FIG. 5 is a schematic diagram of streaming graph disassembling according to an embodiment of the present invention.

Stream computing is performed based on a stream data processing model. In a stream computing system, service processing logic usually needs to be converted to a directed acyclic graph (DAG). As shown in FIG. 4 or FIG. 5, an operator is a service logic carrier, and is a smallest unit that can be scheduled and executed by the stream computing system, and a stream represents data transmission between operators. It should be noted that the stream computing system is merely a typical application scenario of the technical solutions of the present embodiments, and does not constitute a limitation on application scenarios of the present embodiments. Another application scenario that is related to stream application optimization is applicable to the technical solutions of the embodiments of the present invention.

Figure 2B:
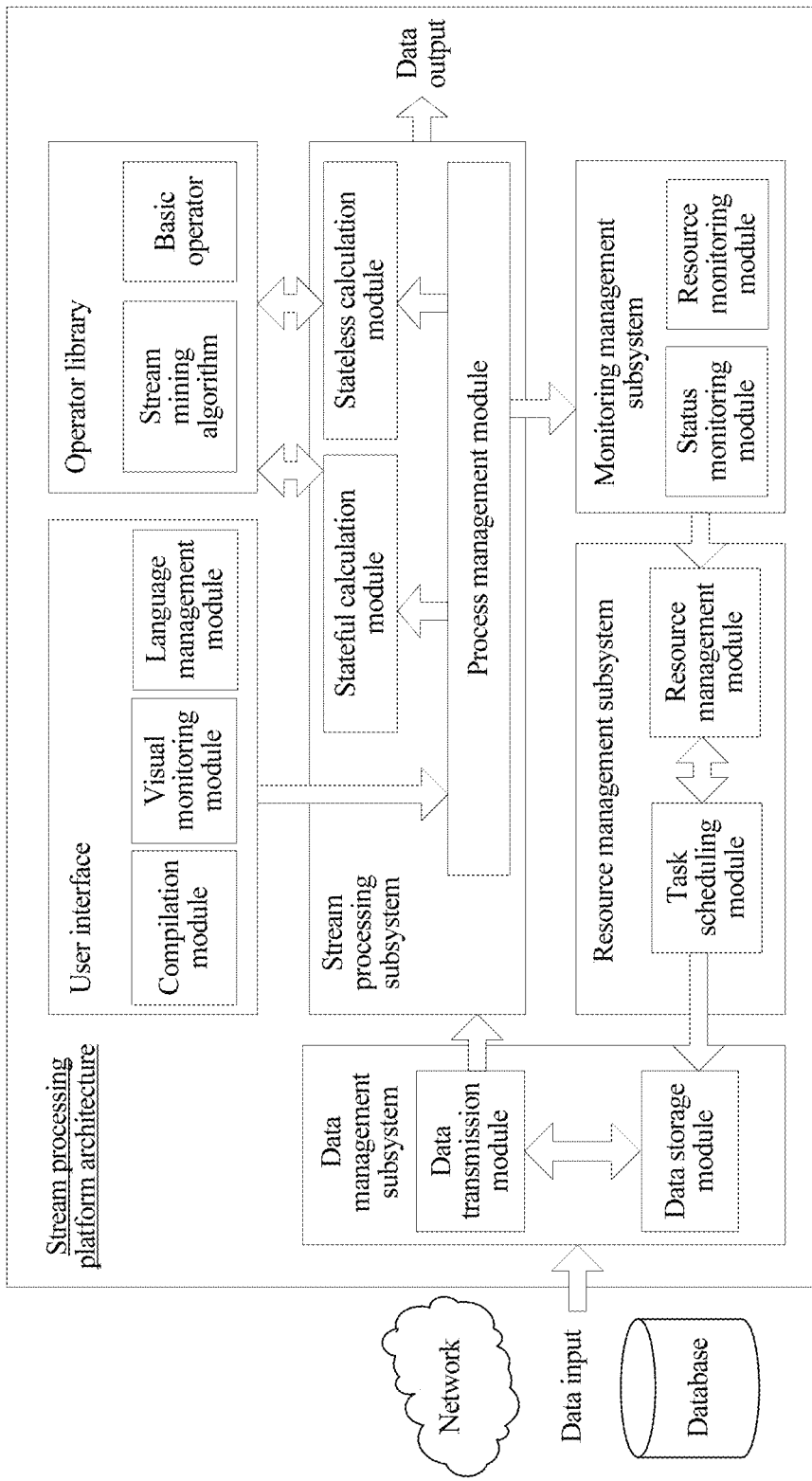
FIG. 2B is a schematic diagram of an architecture of a stream processing platform according to an embodiment of the present invention.

FIG. 2B is a schematic diagram of an architecture of a stream processing platform according to an embodiment of the present invention.

As shown in FIG. 2B, a stream processing platform may include a resource management module, a task scheduling module, a status/resource monitoring module, and a data transmission and storage module that are at a bottom layer, various operator processing units that can run at an upper layer, a suite developed user interface, and an optional operator library. Certainly, an architecture of the stream processing platform is not limited to the architecture shown in FIG. 2B, and some subsystems or modules may be added or removed based on FIG. 2B. When developing an application scenario on a stream system, a user completes application customization by using a user interface and then deploys an application on the stream processing platform so as to implement stream processing of the application.

To resolve problems of imbalanced computing logic and redundant flow transmission in a streaming graph compiled by a user who lacks stream application development experience, the embodiments of the present invention propose a streaming graph optimization method and apparatus.

Figure 3:
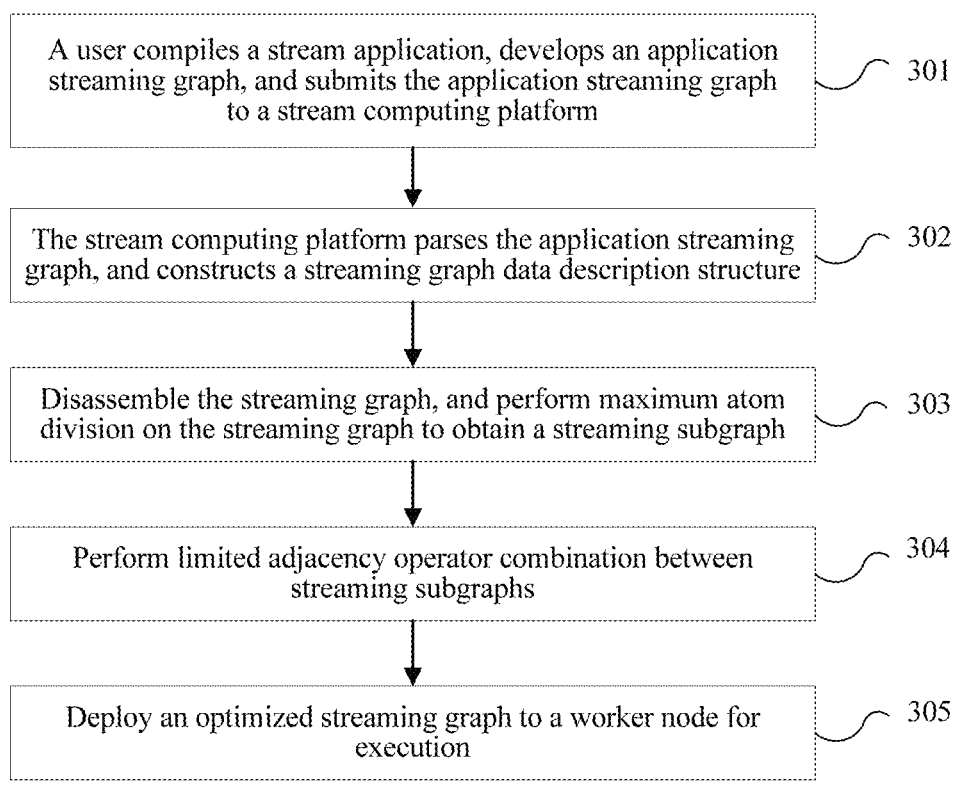
FIG. 3 is a flowchart of a streaming graph optimization method according to an embodiment of the present invention.

FIG. 3 is a flowchart of a streaming graph optimization method according to an embodiment of the present invention.

S301. A user compiles a stream application, develops a stream application streaming graph, and submits the application streaming graph to a stream computing platform.

S302. The stream computing platform parses the application streaming graph, and constructs a streaming graph data description structure.

Specifically, the stream computing platform parses the received user streaming graph, constructs the streaming graph data description structure, and describes a relationship between a streaming graph operator and a data stream side.

S303. Disassemble the streaming graph, and perform maximum atom division on the streaming graph to obtain a streaming subgraph.

Specifically, as shown in FIG. 4, streaming graph types include a pulse streaming graph, a split streaming graph, and an iterative streaming graph.

In the pulse streaming graph, as shown in FIG. 4(a), sequential flowing-through of a data stream in an arrangement order of streaming graph operators is a most basic processing type of stream application. The pulse streaming graph includes a pulse operator. An operator Operator 1 is a pulse operator and includes window cache, and data output has a batch processing characteristic.

In the split streaming graph, as shown in FIG. 4(b), the data stream is split at an inlet operator, and aggregates at an outlet operator. A stream splitting manner includes multiple manners such as copying and distributing. The split streaming graph includes a split operator, such as an operator Operator 2 or an Operator 3. The operator Operator 2 is an inlet operator of the split streaming graph, and an outlet flow volume at the operator Operator 2 increases. The operator Operator 3 is an outlet operator of the split streaming graph, and an outlet flow volume at the operator Operator 3 decreases. The operator Operator 2 or the Operator 3 may be used as a boundary operator of the split streaming graph.

In the iterative streaming graph, as shown in FIG. 4(c), an output data stream at a successor operator returns to a predecessor operator as an input stream for iterative processing. The iterative streaming graph includes an iterative operator such as an operator Operator 4 or an Operator 5. The operator Operator 4 is an inlet operator of the iterative streaming graph, and the operator Operator 5 is an outlet operator of the iterative streaming graph. An intermediate result of iterative computing is transmitted repeatedly in a streaming subgraph, and a data transmission quantity is large. Numerous data flows are aggregated in the streaming subgraph, and the operator Operator 4 or the Operator 5 may be used as a boundary operator of the iterative streaming graph.

The disassembling the streaming graph, and performing maximum atom division on the streaming graph to obtain a streaming subgraph is specifically: as shown in FIG. 5, traversing the operators in the streaming graph to find all operators of multiple types as an alternative split boundary set; selecting, in descending order of priorities, a boundary operator from the operators of multiple types where the descending order of priorities is successively an iterative operator, a split operator, and a pulse operator; an operator of multiple types, such as the operator Operator 1 in FIG. 5, is not only a pulse operator but also a split operator, and is used as a split operator of a high priority; and dividing, by using the maximum atom division principle of streaming graph types and according to the selected boundary operator, the operators in the streaming graph to obtain at least one streaming subgraph, where the maximum atom division principle means that a streaming subgraph obtained through splitting includes as many operators as possible, but complies with a constraint of single type, and ambiguity of streaming graph types does not exist, that is, the streaming subgraph obtained through splitting belongs to only one of an iterative streaming graph, a split streaming graph, or a pulse streaming graph.

S304. Perform limited adjacency operator combination between streaming subgraphs.

Performing limited adjacency operator combination between streaming subgraphs is specifically: performing adjacency operator combination on the at least one streaming subgraph according to processing logic complexity of each streaming subgraph to obtain an optimized streaming graph, so that the processing logic complexity of each streaming subgraph is balanced after the adjacency operator combination.

Specifically, a combination range is determined according to a cluster system resource and operator logic complexity, and adjacency operator combination is performed, in the determined combination range, on the at least one streaming subgraph according to a combination algorithm to obtain the optimized streaming graph, so that the processing logic complexity of each streaming subgraph is balanced after the adjacency operator combination.

Specifically, adjacency operator combination is performed based on a streaming graph disassembling result, and two elements need to be calculated: a quantity of available central processing unit (CPU) cores in a cluster and operator logic complexity.

A CPU core whose usage is less than M is an available core. An operator combination range is determined with reference to user configuration. $0 \leq M \leq 1$, and M may be set according to the cluster system resource and the operator logic complexity, for example, may be 50%.

If a to-be-combined adjacency operator is a system operator, adjacency operator combination is performed on the at least one streaming subgraph according to a combination priority list, and for the system operator, a fixed combination priority list exists.

If a to-be-combined adjacency operator is a user-defined operator, operator relative complexity before combination and operator relative complexity after combination that are of the user-defined operator are calculated, and adjacency operator combination is performed on the at least one streaming subgraph to obtain the optimized streaming graph, so that the operator relative complexity after combination is less than or equal to N times the operator relative complexity before combination, where N is greater than or equal to 1, and may be set according to the cluster system resource and the operator logic complexity, for example, may be 120%.

For example, a cluster has three worker operators whose quantities of available CPU cores are 3, 2, and 3 respectively, and therefore a total quantity of available CPU cores is 8. An operator combination upper limit is 8, that is, at least eight actual operators need to be remained after combination. A lower limit is 0, that is, no combination is performed, especially when system resources are sufficient, operator combination is totally unnecessary. A user may adjust a combination value of the upper limit and the lower limit according to an actual situation, so as to control a combination range.

Operators are classified into a system operator and a user-defined operator. The system operator is a library operator that is provided by a platform for a user for direct use. Operator logic complexity is fixed, and therefore a fixed combination priority list exists. The user-defined operator is a processing operation that is implemented by a user by inheriting a development interface that is provided by a platform. Complexity of this type of operator needs to be determined after calculation, and a complexity calculation method includes but is not limited to various common code complexity calculation methods, for example, an operator execution time may be used to represent the operator complexity.

Operator combination may be implemented in various manners, which include but are not limited to process communication, thread communication, and function call. Operator complexity after combination cannot be excessively higher than adjacency operator complexity; otherwise, an imbalanced calculation load may be caused, for example, the operator complexity after combination does not exceed 120% of operator complexity before combination.

Operator combination is to achieve the following objective: converting data transmission between operators into message interaction of higher performance, for example, changing cross-network communication to inter-process communication, changing inter-process communication to inter-thread message transfer, or changing thread message transfer to ordinary function call, so as to reduce problems of operator hover and computing resource waste caused by a data transmission delay.

For a system operator of extremely high complexity, such as Join, Agg, complex event processing (CEP), or another system operator, and a user-defined operator of extremely high complexity, combination is difficult, calculation is complex, and an optimization effect is hardly ensured. Therefore, unless a user sets a minimum operator optimization value, an operator of this type is not combined preferentially.

S305. Deploy the optimized streaming graph to a worker node for execution.

Figure 6:
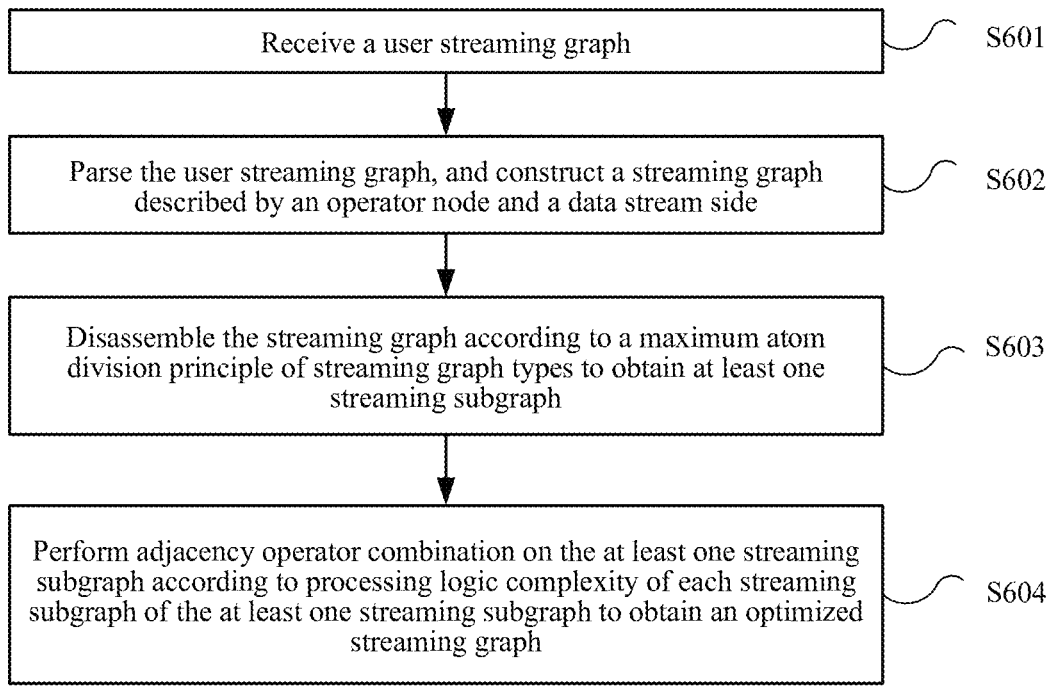
FIG. 6 is a flowchart of another streaming graph optimization method according to an embodiment of the present invention.

FIG. 6 is a flowchart of another streaming graph optimization method according to an embodiment of the present invention.

S601. Receive a user streaming graph.

Specifically, a user compiles a streaming graph, and a stream computing platform receives the streaming graph submitted by the user.

S602. Parse the user streaming graph, and construct a streaming graph described by an operator node and a data stream side.

Specifically, the stream computing platform parses the received streaming graph, constructs a streaming graph data description structure, and describes a relationship between a streaming graph operator and a data stream.

S603. Disassemble the streaming graph according to a maximum atom division principle of streaming graph types to obtain at least one streaming subgraph, where any streaming subgraph of the at least one streaming subgraph includes as many operators as possible, and belongs to only one of the streaming graph types.

For details about a disassembling process, refer to the disassembling method in S303.

S604. Perform adjacency operator combination on the at least one streaming subgraph according to processing logic complexity of each streaming subgraph of the at least one streaming subgraph to obtain an optimized streaming graph, so that the processing logic complexity of each streaming subgraph is balanced after the adjacency operator combination.

For details about an operator combination process, refer to the operator combination method in S304.

Figure 7:
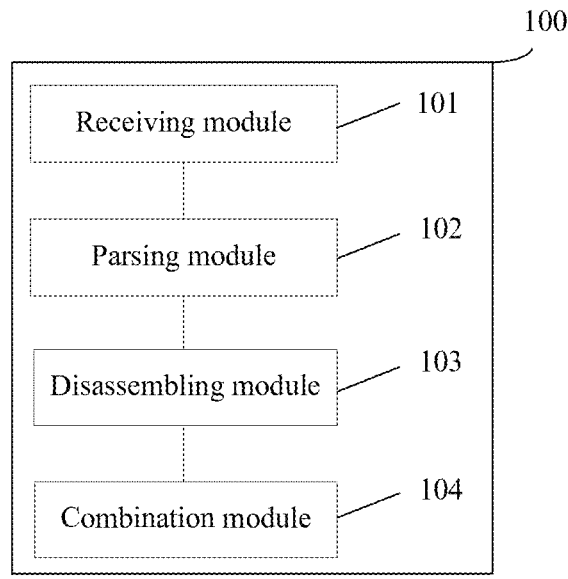
FIG. 7 is a schematic diagram of a streaming graph optimization apparatus according to an embodiment of the present invention.

FIG. 7 is a schematic diagram of a streaming graph optimization apparatus according to an embodiment of the present invention.

As shown in FIG. 7, a streaming graph optimization apparatus 100 includes a receiving module 101, a parsing module 102, a disassembling module 103, and a combination module 104.

The receiving module 101 is configured to receive a streaming graph.

Specifically, a user compiles a streaming graph, and the receiving module 101 receives the streaming graph submitted by the user.

The parsing module 102 is configured to parse the streaming graph, and construct a streaming graph operator and a data stream side description structure.

Specifically, the parsing module 102 parses the received streaming graph, constructs a streaming graph data description structure, and describes a relationship between a streaming graph operator and a data stream.

The disassembling module 103 is configured to disassemble the streaming graph according to a maximum atom division principle of streaming graph types to obtain at least one streaming subgraph.

Specifically, as shown in FIG. 4, streaming graph types include a pulse streaming graph, a split streaming graph, and an iterative streaming graph.

In the pulse streaming graph, as shown in FIG. 4(*a*), sequential flowing-through of a data stream in an arrangement order of streaming graph operators for corresponding processing is a most basic processing type of stream application. The pulse streaming graph includes a pulse operator. An operator Operator 1 is a pulse operator and includes window cache, and data output has a batch processing characteristic.

In the split streaming graph, as shown in FIG. 4(*b*), the data stream is split at an inlet operator, and aggregates at an outlet operator. A stream splitting manner includes multiple manners such as copying and distributing. The split streaming graph includes a split operator. An operator Operator 2 is an inlet operator of the split streaming graph, and an outlet flow volume at the operator Operator 2 increases. An operator Operator 3 is an outlet operator of the split streaming graph, and an outlet flow volume at the operator Operator 3 decreases. The operator Operator 2 or the Operator 3 may be used as a boundary operator of the split streaming graph.

In the iterative streaming graph, as shown in FIG. 4(*c*), an output data stream at a successor operator returns to a predecessor operator as an input stream for iterative processing. The iterative streaming graph includes an iterative operator. An operator Operator 4 is an inlet operator of the iterative streaming graph, and an operator Operator 5 is an outlet operator of the iterative streaming graph. An intermediate result of iterative computing is transmitted repeatedly in a streaming subgraph, and a data transmission quantity is large. Numerous data flows are aggregated in the streaming subgraph, and the operator Operator 4 or the Operator 5 may be used as a boundary operator of the iterative streaming graph.

Figure 8:
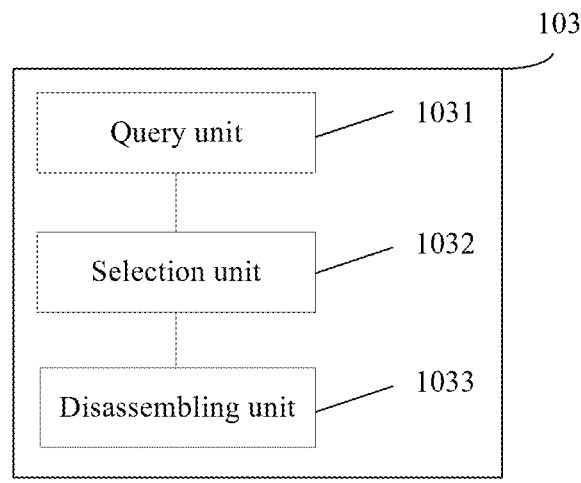
FIG. 8 is a schematic diagram of a disassembling module according to an embodiment of the present invention.

Specifically, as shown in FIG. 8, the disassembling module 103 includes a query unit 1031, a selection unit 1032, and a disassembling unit 1033.

The query unit 1031 is configured to traverse the operators in the streaming graph to find all operators of multiple types as an alternative split boundary set.

The selection unit 1032 is configured to select, in descending order of priorities, a boundary operator from the operators of multiple types, where the descending order of priorities is successively an iterative operator, a split operator, and a pulse operator; an operator of multiple types, such as the operator opt in FIG. 5, is not only a pulse operator but also a split operator, and is used as a split operator of a high priority.

The disassembling unit 1033 is configured to divide, by using the maximum atom division principle of streaming graph types and according to the selected boundary operator, the operators in the streaming graph to obtain at least one streaming subgraph, where the maximum atom division principle means that a streaming subgraph obtained through splitting includes as many operators as possible, but complies with a constraint of single type, and ambiguity of streaming graph types does not exist, that is, the streaming subgraph obtained through splitting belongs to only one of an iterative streaming graph, a split streaming graph, or a pulse streaming graph.

The combination module 104 is configured to perform adjacency operator combination on the at least one streaming subgraph according to processing logic complexity of each streaming subgraph of the at least one streaming subgraph to obtain an optimized streaming graph, so that the processing logic complexity of each streaming subgraph is balanced after the adjacency operator combination. Specific implementation is as follows.

A combination range is determined according to a cluster system resource and operator logic complexity, and adjacency operator combination is performed, in the determined combination range, on the at least one streaming subgraph according to a combination algorithm to obtain the optimized streaming graph, so that the processing logic complexity of each streaming subgraph is balanced after the adjacency operator combination.

Adjacency operator combination is performed on the at least one streaming subgraph according to the combination algorithm to obtain the optimized streaming graph.

Specifically, the combination module 104 determines the combination range according to the cluster system resource and the operator logic complexity, and performs adjacency operator combination.

More specifically, adjacency operator combination is performed based on a streaming graph disassembling result, and two elements need to be calculated: a quantity of available CPU cores in a cluster and operator logic complexity.

A CPU core whose usage is less than M is an available core. An operator combination range is determined with reference to user configuration. 0≤M≤1, and M may be set according to the cluster system resource and the operator logic complexity, for example, may be 50%.

If a to-be-combined adjacency operator is a system operator, adjacency operator combination is performed on the at least one streaming subgraph according to a combination priority list to obtain the optimized streaming graph.

If a to-be-combined adjacency operator is a user-defined operator, operator relative complexity before combination and operator relative complexity after combination that are of the user-defined operator are calculated, and adjacency operator combination is performed on the at least one streaming subgraph to obtain the optimized streaming graph, so that the operator relative complexity after combination is less than or equal to N times the operator relative complexity before combination, where N is greater than or equal to 1.

For example, a cluster has three worker operators whose quantities of available CPU cores are 3, 2, and 3 respectively, and therefore a total quantity of available CPU cores is 8. An operator combination upper limit is 8, that is, at least eight actual operators need to be remained after combination. A lower limit is 0, that is, no combination is performed, especially when system resources are sufficient, operator combination is totally unnecessary. A user may adjust a combination value of the upper limit and the lower limit according to an actual situation, so as to control a combination range.

Operators are classified into a system operator and a user-defined operator. The system operator is a library operator that is provided by a platform for a user for direct use. Operator logic complexity is fixed, and therefore a fixed combination priority list exists. The user-defined operator is a processing operation that is implemented by a user by inheriting a development interface that is provided by a platform. Complexity of this type of operator needs to be determined after calculation, and a complexity calculation method includes but is not limited to various common code complexity calculation methods.

Operator combination may be implemented in various manners, which include but are not limited to process communication, thread communication, and function call. Operator complexity after combination cannot be excessively higher than adjacency operator complexity; otherwise, an imbalanced calculation load may be caused.

Operator combination is to achieve the following objective: converting data transmission between operators into message interaction of higher performance, for example, changing cross-network communication to inter-process communication, changing inter-process communication to inter-thread message transfer, or changing thread message transfer to ordinary function call, so as to eliminate problems of operator hover and computing resource waste caused by a data transmission delay.

For a system operator of extremely high complexity, such as Join, Agg, CEP, or another system operator, and a user-defined operator of extremely high complexity, combination is difficult, calculation is complex, and an optimization effect is hardly ensured. Therefore, unless a user sets a minimum operator optimization value, an operator of this type is not combined preferentially.

Figure 9:
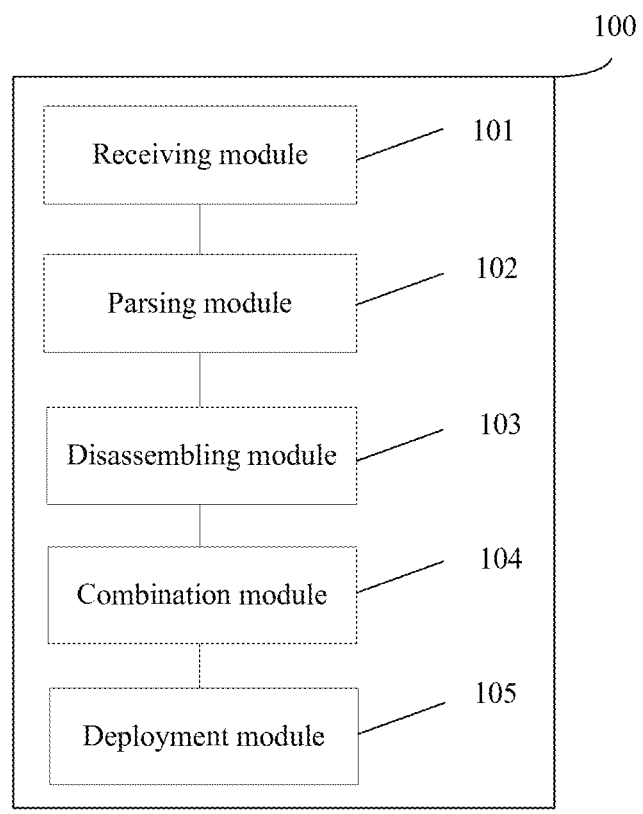
FIG. 9 is a schematic diagram of another streaming graph optimization apparatus according to an embodiment of the present invention.

Optionally, as shown in FIG. 9, the streaming graph optimization apparatus 100 further includes a deployment module 105, which is configured to deploy an optimized streaming graph to a worker node for execution.

Figure 10:
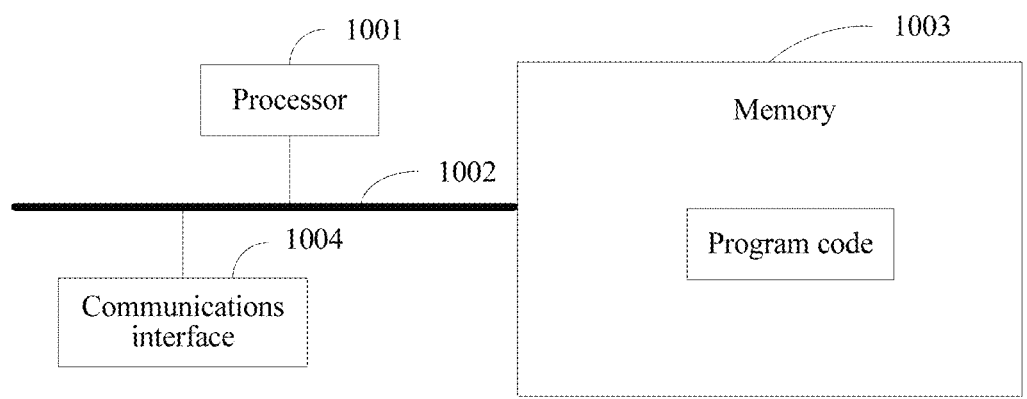
FIG. 10 is a schematic structural diagram of an entity of a streaming graph optimization apparatus according to an embodiment of the present invention.

FIG. 10 shows an entity apparatus diagram of a streaming graph optimization apparatus according to the present embodiments. The streaming graph optimization apparatus includes at least one processor 1001, a communications bus 1002, a memory 1003, and at least one communications interface 1004.

The communications bus 1002 is configured to implement connection and communication between the foregoing components, and the communications interface 1004 is configured to connect to and communicate with an external device.

The memory 1003 is configured to store program code that needs to be executed, and when executing the program code stored in the memory 1003, the processor 1001 implements the following functions: receiving a user streaming graph; parsing the user streaming graph, and constructing a streaming graph described by an operator node and a data stream side; disassembling the streaming graph according to a maximum atom division principle of streaming graph types to obtain at least one streaming subgraph, where any streaming subgraph of the at least one streaming subgraph includes as many operators as possible, and belongs to only one of the streaming graph types; and performing adjacency operator combination on the at least one streaming subgraph according to processing logic complexity of each streaming subgraph of the at least one streaming subgraph to obtain an optimized streaming graph, so that the processing logic complexity of each streaming subgraph is balanced after the adjacency operator combination.

In the embodiments of the present invention, a streaming graph optimization method and apparatus are provided. A stream application streaming graph provided by a user is received, the user streaming graph is parsed, a streaming graph operator node and a data stream side description structure are constructed, the streaming graph is disassembled, and maximum atom division of streaming graph types is implemented, so as to obtain at least one streaming subgraph. Adjacency operator combination is performed on the at least one streaming subgraph according to a combination algorithm to obtain an optimized streaming graph. By disassembling and combining the streaming graph provided by the user, balanced streaming graph computing logic is implemented, redundant flow transmission is reduced, and stream system resource utilization and stream application execution performance are improved.

The present embodiments are described with reference to the flowcharts and/or block diagrams of the method and the apparatus according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as covering the embodiments and all changes and modifications falling within the scope of the present embodiments.

Obviously, persons skilled in the art can make various modifications and variations to the embodiments of the present invention without departing from the spirit and scope of the embodiments of the present invention. The present embodiments are intended to cover these modifications and variations provided that they fall within the scope of protection defined by the following claims and their equivalent technologies.

What is claimed is:

1. A method comprising:
    receiving, by a master node of a stream computing system, a user streaming graph, wherein the streaming computing system comprises multiple worker nodes;
    parsing, by the master node, the user streaming graph and constructing a streaming graph described by an operator node and a data stream side;
    disassembling, by the master node the streaming graph according to a maximum atom division principle of streaming graph types, to obtain at least one streaming subgraph, wherein the at least one streaming subgraph comprises many operators, and wherein the at least one streaming subgraph belongs to only one of the streaming graph types; and
    performing, by the master node, adjacency operator combination on the at least one streaming subgraph according to processing logic complexity of the at least one streaming subgraph, to obtain an optimized streaming graph, so processing logic complexity of the at least one streaming subgraph is balanced after the adjacency operator combination;
    wherein the streaming graph types comprise a pulse streaming graph, a split streaming graph, and an iterative streaming graph;
    wherein the pulse streaming graph comprises sequential flowing-through of a data stream in an arrangement order operators of the streaming graph, wherein the pulse streaming graph comprises a pulse operator, wherein the pulse operator comprises window cache, and wherein data output has a batch processing characteristic;
    wherein the split streaming graph comprises splitting of a data stream at an inlet operator, and aggregation at an outlet operator, wherein the split streaming graph comprises a split operator, and wherein the split operator is an inlet operator or an outlet operator of the split streaming graph; and
    wherein the iterative streaming graph comprises returning of an output data stream at a successor operator to a predecessor operator as an input stream for iterative processing, wherein the iterative streaming graph comprises an iterative operator, and wherein the iterative operator is an inlet operator or an outlet operator of the iterative streaming graph.

2. The method according to claim 1, wherein disassembling the streaming graph according to the maximum atom division principle of streaming graph types comprises:
    traversing the operators in the streaming graph to find operators of multiple types, wherein the operators of multiple types comprise the iterative operator, the split operator, and the pulse operator;
    selecting, in descending order of priorities, from the operators of multiple types, an operator for a boundary operator, wherein the descending order of the priorities is successively an iterative operator, a split operator, and a pulse operator; and
    dividing, using the maximum atom division principle of streaming graph types and according to the selected boundary operator, the operators in the streaming graph, to obtain at least one streaming subgraph, wherein the maximum atom division principle comprises a streaming subgraph obtained through splitting comprises many operators, and wherein the at least one streaming subgraph belongs to one of an iterative streaming graph, a split streaming graph, or a pulse streaming graph.

3. The method according to claim 1, wherein performing adjacency operator combination on the at least one streaming subgraph further comprises:
determining a combination range according to a cluster system resource and operator logic complexity; and
performing, in the determined combination range, adjacency operator combination on the at least one streaming subgraph according to a combination algorithm, to obtain the optimized streaming graph, so the processing logic complexity of the at least one streaming subgraph is balanced after the adjacency operator combination.

4. The method according to claim 3, wherein performing the adjacency operator combination on the at least one streaming subgraph according to a combination algorithm comprises:
performing adjacency operator combination on the at least one streaming subgraph according to a combination priority list, to obtain the optimized streaming graph, wherein a to-be-combined adjacency operator is a system operator.

5. The method according to claim 3, wherein performing the adjacency operator combination on the at least one streaming subgraph according to a combination algorithm comprises:
performing adjacency operator combination on the at least one streaming subgraph, to obtain the optimized streaming graph, so operator relative complexity after combination is less than or equal to N times operator relative complexity before combination, wherein N is greater than or equal to 1, wherein a to-be-combined adjacency operator is a user-defined operator.

6. The method according to claim 1, wherein the method further comprises:
deploying the optimized streaming graph to a worker node of the multiple worker nodes for execution.

7. A master node of a streaming computing system, wherein the streaming computing system comprises multiple worker nodes, and wherein the master node comprises:
a processor; and
a non-transitory computer readable storage medium storing a program for execution by the processor, the program including instructions to:
receive a streaming graph;
parse the streaming graph, and construct a streaming graph operator and a data stream side description structure;
disassemble the streaming graph according to a maximum atom division principle of streaming graph types to obtain at least one streaming subgraph; and
perform adjacency operator combination on the at least one streaming subgraph according to processing logic complexity of the at least one streaming subgraph, to obtain an optimized streaming graph, so the processing logic complexity of the at least one streaming subgraph is balanced after the adjacency operator combination;
wherein the streaming graph types comprise a pulse streaming graph, a split streaming graph, and an iterative streaming graph;
wherein the pulse streaming graph comprises sequential flowing-through of a data stream in an arrangement order of operators of the streaming graph, wherein the pulse streaming graph comprises a pulse operator, wherein the pulse operator comprises window cache, and wherein data output has a batch processing characteristic;
wherein the split streaming graph comprises splitting of a data stream at an inlet operator, and aggregation at an outlet operator, wherein the split streaming graph comprises a split operator, and wherein the split operator is an inlet operator or an outlet operator of the split streaming graph; and
wherein the iterative streaming graph comprises returning of an output data stream at a successor operator to a predecessor operator as an input stream for iterative processing, wherein the iterative streaming graph comprises an iterative operator, and wherein the iterative operator is an inlet operator or an outlet operator of the iterative streaming graph.

8. The master node according to claim 7, wherein the instructions to disassemble the streaming graph comprise instructions to:
traverse the operators of the streaming graph to find operators of multiple types, wherein the operators of multiple types comprise the iterative operator, the split operator, and the pulse operator;
select, in descending order of priorities, from the operators of multiple types, an operator for a boundary operator, wherein the descending order of the priorities is successively an iterative operator, a split operator, and a pulse operator; and
divide, using the maximum atom division principle of streaming graph types and according to the selected boundary operator, the operators in the streaming graph, to obtain at least one streaming subgraph, wherein the maximum atom division principle comprises a streaming subgraph obtained through splitting comprises many operators, and wherein the streaming subgraph belongs to one of an iterative streaming graph, a split streaming graph, or a pulse streaming graph.

9. The master node according to claim 7, wherein the instructions to perform adjacency operator combination comprise instructions to:
determine a combination range according to a cluster system resource and operator logic complexity; and
perform, in the determined combination range, adjacency operator combination on the at least one streaming subgraph according to a combination algorithm, to obtain the optimized streaming graph, so the processing logic complexity of the at least one streaming subgraph is balanced after the adjacency operator combination.

10. The master node according to claim 9, wherein the instructions to perform the adjacency operator combination on the at least one streaming subgraph comprise instructions to:
perform adjacency operator combination on the at least one streaming subgraph according to a combination priority list, to obtain the optimized streaming graph, wherein a to-be-combined adjacency operator is a system operator.

11. The master node according to claim 9, wherein the instructions to perform the adjacency operator combination on the at least one streaming subgraph comprise instructions to:
perform adjacency operator combination on the at least one streaming subgraph to obtain the optimized streaming graph, so operator relative complexity after combination is less than or equal to N times operator relative complexity before combination, wherein N is greater than or equal to 1, and wherein a to-be-combined adjacency operator is a user-defined operator.

12. The master node according to claim 7, wherein the instructions further comprise instructions to deploy the optimized streaming graph to a worker node of the multiple worker nodes for execution.

13. A non-transitory computer readable storage medium storing a program for execution by a processor of a master node, the program including instructions for:
receiving a streaming graph;
parsing the streaming graph, and construct a streaming graph operator and a data stream side description structure;
disassembling the streaming graph according to a maximum atom division principle of streaming graph types to obtain at least one streaming subgraph; and
performing adjacency operator combination on the at least one streaming subgraph according to processing logic complexity of the at least one streaming subgraph, to obtain an optimized streaming graph, so the processing logic complexity of the at least one streaming subgraph is balanced after the adjacency operator combination;
wherein the streaming graph types comprise a pulse streaming graph, a split streaming graph, and an iterative streaming graph;
wherein the pulse streaming graph comprises sequential flowing-through of a data stream in an arrangement order of operators of the streaming graph, wherein the pulse streaming graph comprises a pulse operator, wherein the pulse operator comprises window cache, and wherein data output has a batch processing characteristic;
wherein the split streaming graph comprises splitting of a data stream at an inlet operator, and aggregation at an outlet operator, wherein the split streaming graph comprises a split operator, and wherein the split operator is an inlet operator or an outlet operator of the split streaming graph; and
wherein the iterative streaming graph comprises returning of an output data stream at a successor operator to a predecessor operator as an input stream for iterative processing, wherein the iterative streaming graph comprises an iterative operator, and wherein the iterative operator is an inlet operator or an outlet operator of the iterative streaming graph.

14. The non-transitory computer readable storage medium of claim 13, wherein the instructions to disassemble the streaming graph comprise instructions for:
traverse the operators of the streaming graph to find operators of multiple types, wherein the operators of multiple types comprise the iterative operator, the split operator, and the pulse operator;
selecting, in descending order of priorities, from the operators of multiple types, an operator for a boundary operator, wherein the descending order of the priorities is successively an iterative operator, a split operator, and a pulse operator; and
dividing, using the maximum atom division principle of streaming graph types and according to the selected boundary operator, the operators in the streaming graph, to obtain at least one streaming subgraph, wherein the maximum atom division principle comprises a streaming subgraph obtained through splitting comprises many operators, and wherein the streaming subgraph belongs to one of an iterative streaming graph, a split streaming graph, or a pulse streaming graph.

15. The non-transitory computer readable storage medium of claim 13, wherein the instructions to perform adjacency operator combination comprise instructions for:
determining a combination range according to a cluster system resource and operator logic complexity; and
performing, in the determined combination range, adjacency operator combination on the at least one streaming subgraph according to a combination algorithm, to obtain the optimized streaming graph, so the processing logic complexity of the at least one streaming subgraph is balanced after the adjacency operator combination.

16. The non-transitory computer readable storage medium of claim 15, wherein performing the adjacency operator combination on the at least one streaming subgraph according to a combination algorithm comprises:
performing adjacency operator combination on the at least one streaming subgraph according to a combination priority list, to obtain the optimized streaming graph, wherein a to-be-combined adjacency operator is a system operator.

17. The non-transitory computer readable storage medium of claim 15, wherein performing the adjacency operator combination on the at least one streaming subgraph according to a combination algorithm comprises:
performing adjacency operator combination on the at least one streaming subgraph, to obtain the optimized streaming graph, so operator relative complexity after combination is less than or equal to N times operator relative complexity before combination, wherein N is greater than or equal to 1, wherein a to-be-combined adjacency operator is a user-defined operator.

* * * * *